United States Patent
Regner et al.

(10) Patent No.: US 11,977,664 B2
(45) Date of Patent: May 7, 2024

(54) SUPPLY VOLTAGE PROPORTIONALITY MONITORING IN A SYSTEM-ON-CHIP (SOC)

(71) Applicant: NXP USA, Inc., Austin, TX (US)

(72) Inventors: Markus Regner, Munich (DE); Hubert Martin Bode, Haar (DE); Stefan Doll, Munich (DE)

(73) Assignee: NXP USA, Inc., Austin, TX (US)

( * ) Notice: Subject to any disclaimer, the term of this patent is extended or adjusted under 35 U.S.C. 154(b) by 72 days.

(21) Appl. No.: 17/455,689

(22) Filed: Nov. 19, 2021

(65) Prior Publication Data

US 2023/0161875 A1    May 25, 2023

(51) Int. Cl.
| | | |
|---|---|---|
| *G06F 21/75* | (2013.01) | |
| *G01R 19/165* | (2006.01) | |
| *G06F 21/81* | (2013.01) | |
| *H03K 19/17768* | (2020.01) | |

(52) U.S. Cl.
CPC ..... *G06F 21/755* (2017.08); *G01R 19/16552* (2013.01); *G06F 21/81* (2013.01); *H03K 19/17768* (2013.01)

(58) Field of Classification Search
CPC ........ G01R 19/16552; H03K 19/17768; G06F 21/755; G06F 21/81
See application file for complete search history.

(56) References Cited

U.S. PATENT DOCUMENTS

| | | | |
|---|---|---|---|
| 6,774,680 B2 * | 8/2004 | Imagawa ................ | H03K 5/08 327/56 |
| 7,483,328 B2 * | 1/2009 | Kim ........................ | G11C 7/02 365/207 |
| 8,605,401 B2 | 12/2013 | Pedersen et al. | |
| 8,892,903 B1 | 11/2014 | Trimberger | |
| 10,726,122 B2 | 7/2020 | Regner et al. | |
| 2013/0024143 A1 * | 1/2013 | Hadley ............... | G06F 13/1663 702/64 |
| 2013/0187456 A1 * | 7/2013 | Bilhan .................... | G06F 21/86 307/28 |
| 2017/0067942 A1 * | 3/2017 | Kim ........................ | G01R 21/00 |
| 2017/0276705 A1 * | 9/2017 | Seningen ............... | G01R 15/09 |

(Continued)

FOREIGN PATENT DOCUMENTS

WO    WO-2021/196093 A1    10/2021

*Primary Examiner* — Harry R Behm
(74) *Attorney, Agent, or Firm* — Joanna G. Geld (57) ABSTRACT

A System-on-Chip (SoC) includes first and second voltage supply pins configured to receive first and second supply voltages, respectively, a first supply path beginning at the first supply pin, and a supply proportion checker. The first supply path includes a first plurality of voltage supply nodes and a supply switch coupled between adjacent voltage supply nodes, wherein each node is configured to provide a corresponding internal voltage supply to a corresponding portion of the SoC. The supply proportion checker is coupled to receive the corresponding internal voltage supply from each voltage supply node, and configured to determine whether a first internal voltage supply supplied by a first supply node of the first plurality of nodes has a legitimate proportion to a second internal voltage supply supplied by a second supply node of the first plurality of nodes, wherein the legitimacy is checked using only resistors which do not require trimming.

24 Claims, 3 Drawing Sheets

(56) References Cited

U.S. PATENT DOCUMENTS

| | | | |
|---|---|---|---|
| 2017/0308724 A1* | 10/2017 | Kothamasu | .............. G06F 1/26 |
| 2020/0021279 A1 | 1/2020 | Micielli et al. | |
| 2020/0292582 A1 | 9/2020 | Suzuki | |
| 2020/0402602 A1 | 12/2020 | Mahatme et al. | |

* cited by examiner

SUPPLY VOLTAGE PROPORTIONALITY MONITORING IN A SYSTEM-ON-CHIP (SOC)

BACKGROUND

Field

This disclosure relates generally to system-on-chips (SoCs), and more specifically, to supply voltage proportionality monitoring within an SoC.

Related Art

It is common today for SoCs, such as microcontrollers and microprocessors, to have more than one voltage supply rail. Similarly, it is common for SoCs to have switchable supply rails in order to support different power modes. However, the supply rails provide avenues for hackers to attack an SoC and compromise the safety or security functions of the SoC. There are multiple different attack approaches to influence an SoC's behavior by compromising one or more supply voltages. For example, hackers may attempt to affect the behavior of an SoC by oversupplying or undersupplying one or more supply rails. As another example, hackers can attempt to power portions of the SoC through illegitimate or parasitic supply paths to influence an SoC's operation.

Although on-chip high/low voltage monitors are used today to determine whether a particular voltage supply is operating within an acceptable voltage range (e.g. at least a predetermined minimum operating voltage), these are not sufficient to detect some of the attack scenarios and are often not enabled or functional at power-up. For example, these known high/low voltage monitors typically require the application of trim values prior to activating the monitor to properly determine if the supply voltage is within an acceptable voltage range. Since these trim values are not available until sometime after power-up of an SoC, after the trim values are loaded and applied, the SoC may be left vulnerable to an attack between the power-up and the activation of the voltage monitors. Therefore, a need exists for improved supply voltage monitoring within an SoC.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a supply proportion checker is used within an SoC to check that the various supply rails within the SoC are operating within legitimate proportions to other supply rails and can cause an SoC reset in the case that any fails are detected. In one embodiment, each supply rail, including those at the pins of the SoC and those internal to the SoC, is routed to the supply proportion checker. In addition, the control settings for the internal voltage supply switches between supply rails are also made available to the supply proportion checker. The supply proportion checker checks proportionality of voltage rails with respect to each other (either along a same voltage path, or across voltage paths or domains) and with respect to the control settings, in order to attempt to protect against a variety of attack scenarios. These types of proportionality checks also do not require the application of trim values for precise voltage level checking. This allows the supply proportion checker to be activated at power-up to provide early protection, prior to the availability of trim values to any high/low voltage monitors on the SoC. In this manner, improved protection of the SoC may be achieved.

Figure 1:
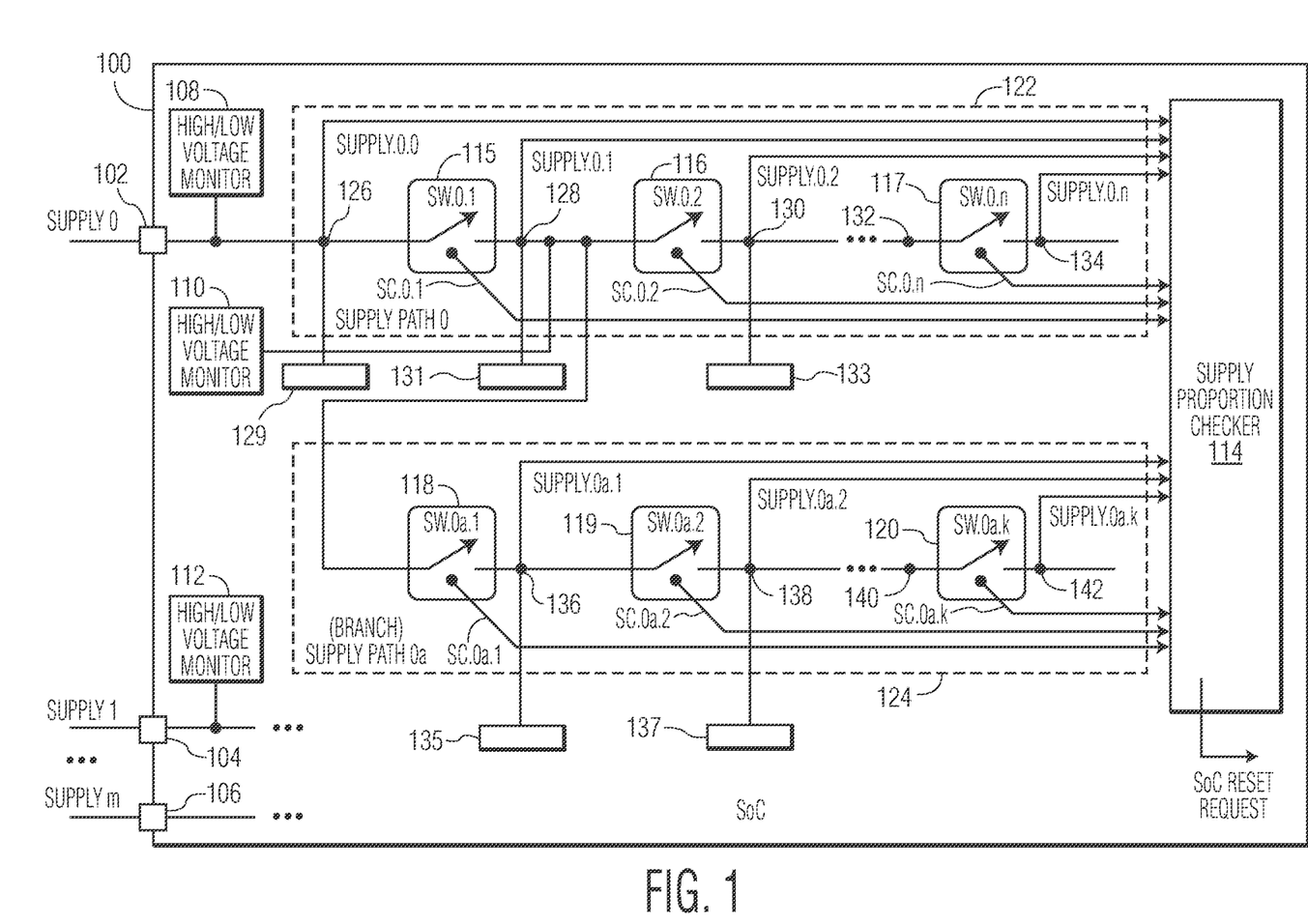
FIG. 1 illustrates, in block diagram form, an SoC having a supply proportion checker in accordance with one embodiment of the present invention.

FIG. 1 illustrates, in block diagram form, an SoC 100 having a supply proportion checker 114, in accordance with one embodiment of the present invention. SoC 100 is implemented as an integrated circuit (IC) and can be any type of SoC, such as, for example, a microcontroller, microprocessor, or any other type of device. SoC 100 includes a plurality of externally accessible voltage supply input pins, including pins 102, 104, and 106, in which each is configured to receive a corresponding supply voltage. In one embodiment, SoC 100 includes m+1 supply pins, each capable of receiving a corresponding supply voltage, supply 0-supply m, in which m can be any integer greater than or equal to one. Each pin provides a corresponding voltage supply path within SoC 100 (and although they may be separate supply pins, they do not necessarily carry different voltage levels). For example, pin 102 receives supply 0 which is provided to a corresponding supply path 0 122 (which may simply be referred to as supply path 0). Supply path 0 includes a first voltage supply node at pin 102 (considered the root of supply path 0) which provides an internal supply voltage (supply.0.0), a second voltage supply node 128 which provides an internal supply voltage (supply.0.1), a third voltage supply node 130 which provides an internal supply voltage (supply.0.2), a fourth voltage supply node 132 which provides an internal voltage supply, and a fifth voltage supply node 134 which provides an internal supply voltage (supply.0.n). In the illustrated embodiment, supply path 0 includes n+1 supply nodes, each configured to provide a corresponding internal supply voltage, in which n can be any integer greater than or equal to zero. Each internal supply node within supply path 0 is labeled with a "0.0" following "supply" to correlate the supply node to the supply path.

In one embodiment, each internal supply voltage corresponds to a voltage domain of SoC 100. For example, SoC 100 includes voltage domains 129, 131, 133, 135, and 137 (which are each powered by a supply path which branches from supply path 0). Voltage domain 129 is powered by supply.0.0, voltage domain 131 by supply.0.1, voltage domain 133 by supply.0.2, voltage domain 135 by supply.0a.1, and voltage domain 137 by supply.0a.2. Each voltage domain includes a portion of SoC 100 which is powered by the corresponding supply voltage. For example, one voltage domain may include one or more cores, another voltage domain may include a memory, another voltage domain may include a different memory, etc. SoC 100 may include any number of voltage domains (also referred to as power domains), in which each voltage domain may also be referred to as a portion of SoC 100 or an IC portion.

The internal voltage supply nodes of a supply path are coupled by way of supply switches, such as switches 115, 116, and 117. For example, switch 115 (referred to as SW.0.1) has a first terminal connected to node 126, a second terminal connected to node 128, and a control terminal coupled to receive a switch control signal (SC.0.1). As with the internal supply voltages, each switch is labeled with a "0.0" following the "SW" to correlate the switch to the supply path, and each control signal is labeled with a "0.0" following the "SC" to correlate the control signal to the switch. As used herein, when the corresponding control signal of a switch is asserted, the switch is closed or conductive such that the first terminal conducts current to the second terminal, and when the corresponding control signal of the switch is negated (or deasserted), the switch is open or non-conductive such that the first terminal does not conduct current to the second terminal. Therefore, the state of the corresponding switch control signal indicates the state of the switch as opened or closed.

In the illustrated embodiment, supply path 0 includes n supply switches. Switch 116 (referred to as SW.0.2) has a first terminal connected to node 128, a second terminal connected to node 130, and a control terminal coupled to receive a switch control signal (SC.0.2). Switch 117 (referred to as SW.0.n) has a first terminal connected to node 132, a second terminal connected to node 134, and a control terminal coupled to receive a switch control signal (SC.0.n).

Any supply path can also have supply paths branching from the supply path (referred to as branch supply paths). For example, in the illustrated embodiment, supply path 0 has a branch supply path branching from node 128, referred to as supply path 0a 124. Any additional branches from the nodes of supply path 0 can be referred to as branch supply path 0b, 0c, etc., and there can be any number of branch supply paths from any node of a supply path. Note that the voltage at node 128 provides supply.0.1 within supply path 0, but may also be referred to as a first voltage supply node of branch supply path 0a which provides an internal voltage (supply.0a.0) to supply path 0a. In this case, supply.0.1 equals supply.0a.0.

Supply path 0a includes a second voltage supply node 136 which provides an internal supply voltage (supply.0a.1), a third voltage supply node 138 which provides an internal supply voltage (supply.0a.2), a fourth voltage supply node 140 which provides an internal supply voltage, and a fifth voltage supply node 142 which provides an internal supply voltage (supply.0a.k). Therefore, supply path 0a includes k nodes, in which k can be any integer value greater that or equal to zero. The internal voltage supply nodes of supply path 0a are also coupled by way of supply switches, such as switches 118, 119, and 120. Therefore, supply path 0a includes k switches. For example, switch 118 (referred to as SW.0a.1) has a first terminal connected to node 128, a second terminal connected to node 136, and a control terminal coupled to receive a switch control signal (SC.0a.1). Switch 119 (referred to as SW.0a.2) has a first terminal connected to node 136, a second terminal connected to node 138, and a control terminal coupled to receive a switch control signal (SC.0a.2). Switch 120 (referred to as SW.0a.k) has a first terminal connected to node 140, a second terminal connected to node 142, and a control terminal coupled to receive a switch control signal (SC.0a.k). Each internal supply node, switch, and switch control signal of supply path 0a is labeled with a "0.0a" to correlate the supply nodes and switches to the supply path and to correlate the switch control signals to the switches.

As can be seen in the embodiment of FIG. 1, each of the internal supply nodes in supply path 0 provides an internal supply voltage which is based on (e.g. generated from) supply 0 (received at the root of the path). Similarly, any of the internal supply nodes which branch from supply path 0 also provides an internal supply voltage which is based on (e.g. generated from) supply 0. The internal supply nodes in any path having pin 104 at the root of the path generates internal supply voltages based on supply 1, and internal supply nodes in any path having pin 106 at the root of the path generate supply voltages based on supply m. Therefore, SoC 100 can include any network of supply paths, in which any supply path can have any number of supply paths branching out from any of its internal voltage nodes, and the branch supply paths can likewise have any supply paths branching out from its internal voltage nodes. Also, as used herein, each supply path has a corresponding beginning node (which may or may not correspond to a root node). For example, node 126 may be considered the beginning node for supply path 0, while node 128 may be considered the beginning node for supply path 0a. Portions of supply paths may also overlap. For example, in one embodiment, supply path 0a may be considered as having node 126 as its beginning node, and branching from supply path 0 at node 128 to node 136, node 138, etc. Note that the internal voltage supply nodes may also be referred to as internal voltage supply rails.

Each of the internal voltage supply nodes (i.e. rails) can be routed to different portions of SoC 100 to power different circuits within SoC 100, as illustrated with voltage domains 129, 131, 133, 135, and 137. The internal supply switches are located between voltage domains, such as switch 115 between domains 129 and 131, switch 119 between domains 135 and 137, etc. The internal supply switches may be used, for example, to remove power from a voltage domain by opening the switch to the voltage domain or to apply power to a voltage domain by closing the one or more switches between the voltage domain and the pin at the root of the corresponding path. In one embodiment, each of the internal voltage supply nodes is also routed to supply proportion checker 114. Alternatively, each internal voltage supply node can be selectively provided (i.e. provided or not provided) to supply proportion checker 114, as needed. Supply proportion checker 114 is also aware of the state for each of the switch control signals. That is, the switch control signals are not provided by or controlled by supply proportion checker 114. The arrows "routing" the switch control signals to supply proportion checker 114 are simply intended to indicate that the current switch position can be detected or determined by supply proportion checker 114 without influencing the current switch position. Supply proportion checker 114 generates an SoC reset request in response to any failed check.

SoC 100 also includes high/low voltage monitors (VMs) which can be used to independently monitor a particular voltage supply node or rail. For example, a high/low VM 108 is connected to pin 102 to monitor supply 0 received at pin 102, a high/low VM 110 is connected to node 128 to monitor internal supply supply.0.1, and a high/low VM 112 is connected to pin 104 to monitor supply 1. Each of these VMs monitor the corresponding supply voltage against precise reference voltages to verify that each monitored supply voltage is operating within its expected voltage range. For example, high/low VM 108 independently monitors supply 0 to make sure it is operating within is expected voltage range, while high/low VM 110 independently monitors supply.0.1 to make sure it is operating within its expected voltage range. SoC 100 may include any number of VMs, each independently monitoring any of the internal supply voltages or rails. In order to properly monitor the internal supply voltages, note that trim values are used by each of the monitors (e.g. by the comparators and reference generators of the monitors) to ensure that the expected voltage range is accurately represented for the monitoring. Each of the high/low VMs can also request an SoC request upon detecting that a corresponding internal supply voltage falls outside the expected range. Note that in alternate embodiments, one or more of the high/low VMs illustrated in FIG. 1 may not be present.

In operation, by providing all the internal voltage supplies to supply proportion checker 114, supply proportion checker 114 can determine whether the internal voltage supplies (including those at the SoC boundary received at the pins and those generated along any supply path) have legitimate proportions to each other. Furthermore, by incorporating the settings for the switch control switches, supply proportion checker 114 can determine the legitimacy of voltage levels in light of the switch positions. In one embodiment, supply proportion checker 114 continuously checks that a set of legitimacy and proportionality rules are met. In the case that a rule violation is detected, supply proportion checker 114 issues a reset request for an SoC reset.

A first rule type ensures that proportionalities of supplies within a particular supply path are met. For example, this rule may check that one or more of the following conditions are met:

supply.0.0>=supply.0.1>=supply.0.2>= . . . >=supply.0.n
supply.0a.0>=supply.0a.1>=supply.0a.2>=   .   .   .
    >=supply.0a.k
supply.1.0>=supply 1.1>=supply.1.2>= . . . >=supply.1.j In the above example, note that j refers to a number of nodes in a supply path beginning with supply 1.0 from pin 104, in which j can be any value greater than or equal to 1. In each of the conditions above, there may be fewer comparisons in the chain if there are fewer nodes. For example, for supply path 0, if there are only 2 nodes, there may be only one comparison in the corresponding condition (supply.0.0>=supply.0.1). The above list of conditions is not exhaustive, in that these types of conditions may be checked by supply proportion checker 114 for any supply path within SoC 100. In another example, the supplies are checked to be in proper ratio with each other, in which, for example, another condition may include a comparison such as "supply.0.0<=(supply.0.1)*1.1<=(supply.0.2)*1.1" which checks to ensure that a particular supply is not heavily overdriven as compared to a subsequent internal supply in the path. In summary, for the first rule type, internal supply voltages within a supply path are compared to at least one other internal supply voltage within the same supply path to ensure the correct expected proportionality. For example, a node later in the path (further away from the beginning node of the path) should not provide a voltage supply which is greater than one earlier in the path (closer to the beginning node of the path).

However, note that there are legitimate effects caused by, for example, load changes which may result in a supply X of a path (which should be greater than supply Y in the path) to be minimally and momentarily less than supply Y. Therefore, in checking the conditions for the first rule type, supply proportion checker 114 can be implemented to include respective tolerances. For example, supply proportion checker 114 may check that one supply within a path is not greater than a predetermined voltage level above the next supply within the same path (e.g. not greater than 105% of the next supply), or that the supply within the path is not greater than the next supply within the same path for more than a predetermined amount of time. Therefore, any type of qualifications can be used to ensure that the conditions are met within proper tolerances.

A second rule type ensures that supply proportionality across supply paths are met (e.g. ensures that voltage rails which are always supposed to hold higher voltage levels than other voltage rails are maintained as such). For example, all the supplies at the pins (e.g. supply.0.0, supply.1.0, supply.2.0, . . . , supply.m.0). can be classified as per their intended voltage levels into a particular category:

Category A (supply voltages intended to supply 5V)
Category B (supply voltages intended to supply 3.3V)
Category C (supply voltages intended to supply 1.8V)
Category D (supply voltages intended to supply 1.1V)
Category E (supply voltages intended to supply 0.8V).

(Note that the above voltage supply values are only examples, and there may also be any number of categories, fewer or greater than five.) To ensure the proper proportionality across supply paths, the second rule type may check that one or more of the following conditions are met, with respect to the category classifications:

Supplies within Category A>=supplies within Category B
Supplies within Category B>=supplies within Category C
Supplies within Category C>=supplies within Category D
Supplies within Category D>=supplies within Category E In one embodiment, internal supply voltages provided by the nodes within the supply paths can be classified into categories (such as categories A-E), and those classifications can be stored within storage circuitry within supply proportion checker 114. Proportional supply checker 114 can than check that the proper relationship between supplies of different categories is maintained, indicating a failure otherwise. As with the conditions in for the first rule type, any type of qualifications can be used for the comparisons in these checks to ensure that the conditions are met within proper tolerances. For example, one supply in a first category (e.g. A) may only need to greater than a percentage (e.g. 90%) of a supply in a second category (e.g. B). Alternatively, or in addition, the one supply needs to be greater than the other supply for at least a predetermined amount of time.

A third rule type ensures that the presence of supplies agrees with the switch states. That is, this rule ensures that the supply level of an internal supply voltage is only non-zero when the corresponding supply switch or switches closer to the beginning node of the supply path is/are set or closed such that the corresponding supply node is connected to a previous supply in the supply path. For example, this rule may include conditions as follows:

supply.0.1 must only be present (non-zero) if SW.0.1 is closed
supply.0.2 must only be present (non-zero) if SW.0.2 and SW.0.1 are both closed
supply.0.n must only be preset (non-zero) if SW.0.1-SW.0.n (i.e. all the switches before in the path) are all closed Note that the state of each switch can be determined by supply proportion checker 114, as indicated by SC.0.1, SC.0.2, SC.0.n, etc. For example, this determination can be made by supply proportion checker 114 checking the state of the switches in storage circuitry within proportion checker 114 or elsewhere within SoC 100. Conditions similar to those above for this rule can be checked for each supply path in SoC 100. For example, supply presence in accordance to the switch states can be checked for supply path 0, supply path 0a, supply path 1, supply path m, etc.

A fourth rule type ensures that the presence of supplies is in accordance with other supplies to ensure that no SoC internal supply voltage is powered while the corresponding "root supply" is absent. As used herein, the "root supply" corresponds to the supply voltage located at a pin of SoC 100. For example, the root of supply.0.n and supply.0a.k is supply.0.0 supplied by pin 102, and the root of supply.1.j is supply.1.0 supplied by pin 104. Therefore, the fourth rule may check that one or more of the following conditions are met:

any of supply.0.1-supply.0.n must only be present (non-zero) if supply.0.0 at pin 102 is present (non-zero)

any of supply.0a.1-supply.0a.k must only be present (non-zero) if supply.0.0 is present (non-zero)

any of supply.1.1-supply.1.j must only be present (non-zero) if supply.1.0 at pin 104 is present (non-zero)

Supply proportion checker 114 may check conditions for each rule type above, as well as for additional conditions, as needed. Supply proportion checker 114 is useful within SoC 100, regardless of the presence of any high/low VMs because supply proportion checker 114 is capable of performing different types of checks than those performed by the high/low VMs, and may therefore detect additional attack scenarios not reliably detectable by the VMs. For example, the high/low VMs asses the value of a single voltage level at the particular location being monitored (such as supply.0.0 alone at node 126 or supply.0.1 alone at node 128), and does not rely on comparisons with other voltage levels (whether in the same supply path or across different supply paths), the settings of supply switches, or the proportionality of supply voltages against each other. Also, since high/low VMs require precise comparison of the monitored voltage levels to particular ranges of allowable voltages, high/low VMs typically rely on elements with corresponding trim values in order to achieve the required levels of accuracy.

Figure 2:
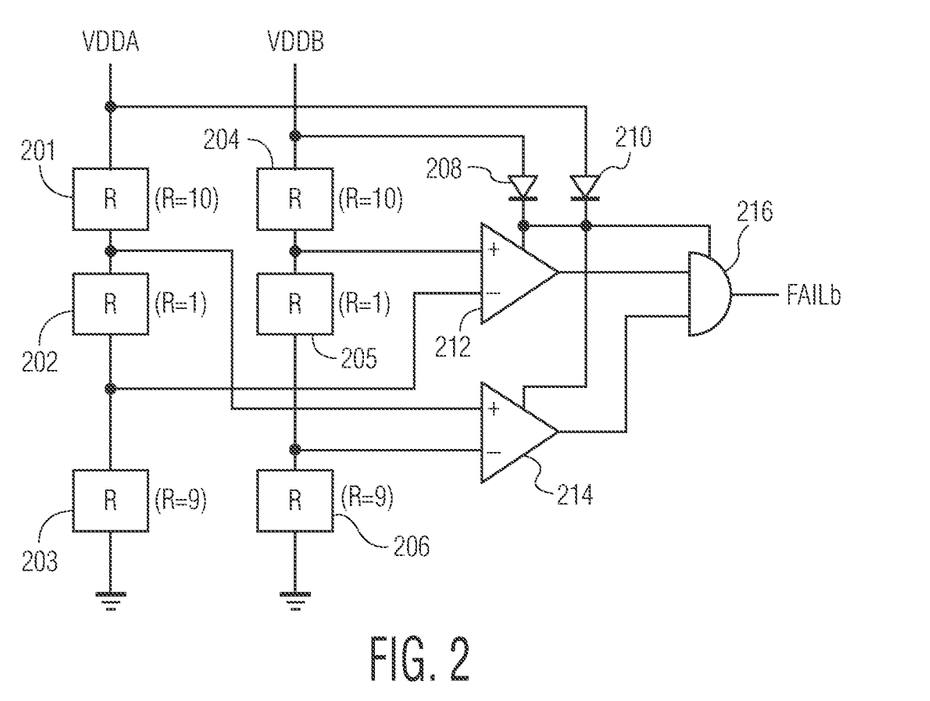
FIG. 2 illustrates, in partial schematic and partial block diagram form, a portion of the supply proportion checker of FIG. 1, in accordance with one embodiment of the present invention.

In one embodiment, supply proportion checker 114 is implemented using passive elements which do not require device trimming. For example, the conditions for each rule type may be checked with comparison circuitry utilizing simple logic gates, comparators, resistors, diodes, or combinations thereof, in which it is not necessary to provide accurate references because instead, comparisons are made between internal voltage supplies. FIG. 2 illustrates an example "building block comparator" which may be used in supply proportion checker 114 which determines whether two supplies (e.g. VDDA and VDDB) are off from each other. The sizing of the resistor ladder can be adapted to perform comparisons between voltage domains with different voltage levels.

FIG. 2 illustrates a portion of supply proportion checker 114 which compares VDDA to VDDB, using only passive, non-trimmed elements. The illustrated portion of supply proportion checker 114 includes a first voltage ladder including resistive elements 201-203 coupled in series between VDDA and ground, and a second voltage ladder including resistive elements 204-206 coupled in series between VDDB and ground. In the illustrated embodiment, resistive element 202 has a resistance (i.e. R=1), while resistive element 201 has a resistance ten times that of resistive element 202 (i.e. R=10, and resistive element 203 has a resistance of nine times that of resistive element 202 (i.e. R=9). Similarly, resistive element 205 has a resistance (i.e. R=1), while resistive element 204 has a resistance ten times that of resistive element 205 (i.e. R=10), and resistive element 206 (i.e. R=9) has a resistance of nine times that of resistive element 205. A comparator 212 has a first (e.g. non-inverting) input coupled to a node between resistive elements 204 and 205, a second (e.g. inverting) input coupled to a node between resistive elements 202 and 203, and an output. A comparator 214 has a first (e.g. non-inverting) input coupled to a node between resistive elements 201 and 202, a second (e.g. inverting) input coupled to a node between resistive elements 205 and 206, and an output. An AND gate 216 receives the output of comparator 212 at a first input, and output of comparator 214 at a second input, and provides an output, FAILb, which when asserted to a logic level zero indicates the condition failed. An anode of a diode 208 is coupled to VDDB, and an anode of a diode 210 is coupled to VDDA. Cathodes of diodes 208 and 210 are coupled to each other and to power terminals of comparator 212, comparator 214, and AND gate 216.

In operation, the example circuit of FIG. 2 checks for the condition that requires VDDA and VDDB to be within 10% of each other. If they are, then the outputs of comparators 212 and 214 would be a logic level one, and thus FAILb would be a logic level one, indicating that the condition was met (no failure was detected). However, if VDDA and VDDB are not within 10% of each other, then the output of at least one of comparators 212 and 214 would be a logic level zero, and thus FAILb would be a logic level zero, indicating that the condition was not met (a failure is detected). Due to the comparisons performed by the circuit of FIG. 2 between voltage supplies VDDA and VDDB using resistor ladders, there is no need to trim resistive elements 201-206 for process, voltage, and temperature (PVT) variations because precise reference values are not required. All the conditions tested by supply proportion checker 114 can be implemented using similar comparison circuitries, as needed, using only those elements which do not require trimming. Without the need to trim any of the elements within supply proportion checker 114, additional protection can be provided sooner after power-up of SoC 100 as compared to any of the high/low VMs.

Figure 3:
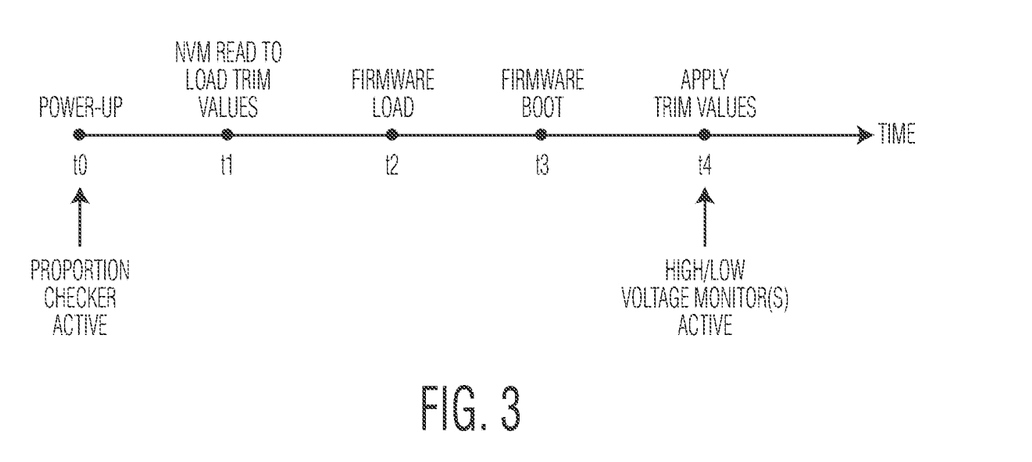
FIG. 3 illustrates, in diagrammatic form, a time line of events within the SoC of FIG. 1, in accordance with one embodiment of the present invention.

FIG. 3 illustrates a time line for a reset sequence of SoC 100 in accordance with one embodiment of the present invention. At time t0, SoC 100 is powered-up (such as in response to a reset). When SoC 100 is first powered up, supply proportion checker 114 can be immediately activated to start checking conditions in accordance with any of the rule types and indicate failures accordingly, such as by requesting SoC reset. At time t1, after t0, a non-volatile memory (NVM) of SoC 100 can be accessed to read and load trim values for use on SoC 100, such as by the high/low VMs in SoC 100. The NVM may include, for example, fuses which store the trim values. After the trim values are loaded, firmware can be loaded by SoC 100 at time t2. For example, firmware may be loaded from the NVM of SoC 100 or from a read only memory (ROM) of SoC 100. At time t3, the firmware boot code can be executed. In alternate embodiments there may not be any firmware loaded or executed. However, only after the trim values are loaded, such as at time t4, can the trim values be applied and thus the high/low VMs be activated. Therefore, note that since supply proportion checker 114 can be implemented with only passive elements which do not require trimming, supply proportion checker 114 can begin its monitoring and checking at time t0, while any of the high/low VMs of SoC 100 cannot begin monitoring and checking until after the reset sequence completes at time t4, which occurs at some time after t0. In this manner, improved protection can be provided by supply proportion checker 114, bridging a critical window of vulnerability between power-up and completion of the reset sequence. Note that supply proportion checker 114 is not limited to the power-up situation, and can maintain operation throughout runtime as well.

Figure 4:
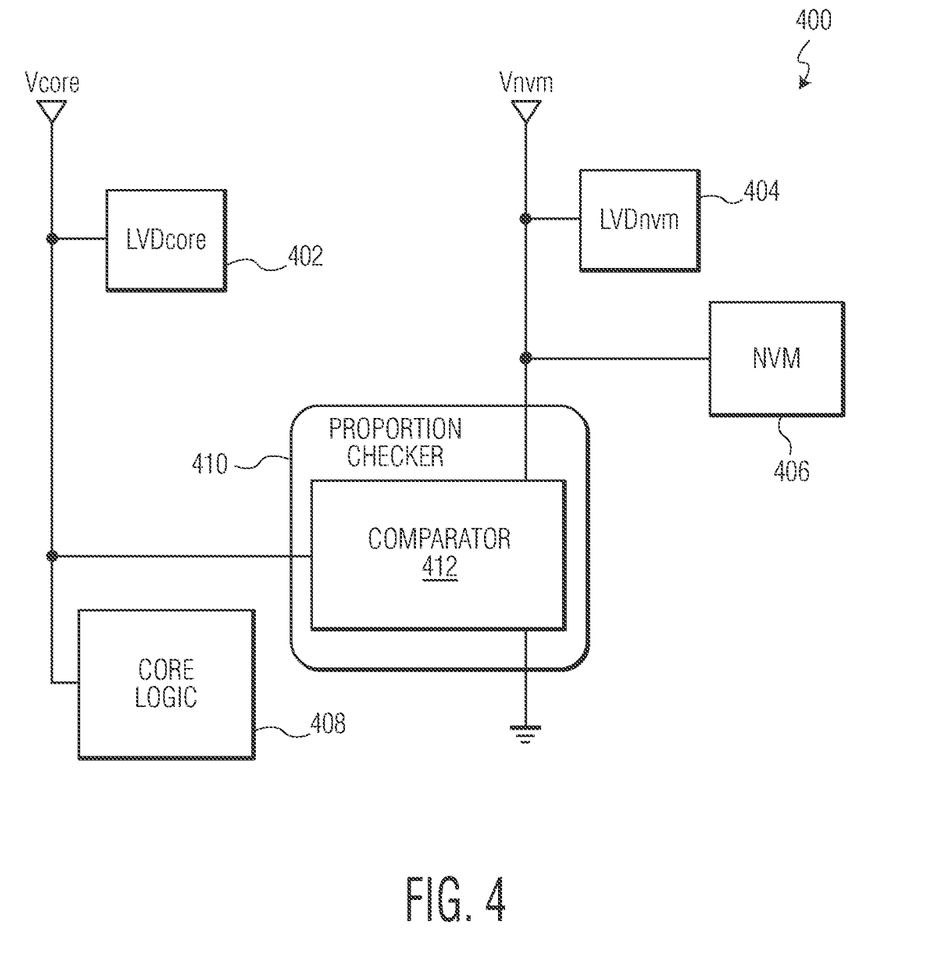
FIG. 4 illustrates, in block diagram form, an example of an SoC having a core, a non-volatile memory (NVM), and a supply proportion checker.

FIG. 4 illustrates, in block diagram form, an SoC 400 in accordance with one embodiment of the present invention. As with SoC 100, SoC 400 can be any type of SoC, such as, for example, a microcontroller, microprocessor, or any other type of device. SoC 400 includes a core having core logic 408, a supply proportion checker 410, an NVM 406, and a low voltage detection circuit (LVD) 402 for the core, and an LVD 404 for the NVM. Each of the LVDs are examples of a high/low VM which monitor that the corresponding voltage supply remains above a corresponding minimum reference voltage, and, if not, initiates an SoC reset. These LVDs require trimming as PVT variations are typically too large to provide accurate comparisons with the minimum reference voltages without trimming.

SoC 400 has a first power supply terminal which provides a voltage supply, Vcore, to core logic 408, and a second power supply terminal which provides a voltage supply, Vnvm, to NVM 406. Note that, for ease of explanation, Vcore and Vnvm can be used to refer to the power supply terminals themselves. Each of Vcore and Vnvm may correspond to a separate voltage domain, and can operate at different voltages. LVD 402 monitors Vcore (by comparing Vcore against a first reference voltage to ensure Vcore remains above that reference voltage), and LVD 406 monitors Vnvm against a second reference voltage to ensure Vnvm remains above that reference voltage). Each of LVDs 402 and 404, as described above, are not able to be activated (i.e. cannot begin monitoring) until the reset sequence of SoC 400 has been completed and the trim values (which may be stored in NVM 406) are applied to the LVDs.

Supply proportion checker 410 includes a comparator 412 which may be implemented similar to the comparison circuitry illustrated in FIG. 2. Comparator 412 is coupled in to Vnvm, Vcore, and ground. In operation, comparator 412 performs a comparison between Vcore and Vnvm, i.e. across voltage domains, which allows supply proportion checker 410 to check for the conditions of the second rule type described above. (Note that comparator 412 may also include other circuit elements, such as resistors and diodes similar to those of FIG. 2, as needed to implement the desired comparison between Vnvm and Vcore.)

In one example, during normal operation of SoC 400, Vnvm provides a supply voltage that is five times higher than the voltage supplied by Vcore. In one embodiment, a resistor network of comparator 412 may be used to divide Vnvm such that the resulting voltage of the divided Vnvm should have the same voltage level as Vcore. Comparator 412 determines if this condition holds true (within acceptable tolerances). If the comparison fails, supply proportion checker 410 initiates a reset of SoC 400. Any network of resistive elements may be implemented in supply proportion checker 410 to validate conditions for the rule types described above, but since these resistive elements do not require trimming, checking by supply proportion checker 410 can begin prior to monitoring by the LVDs. As will be described below, a supply proportion checker 410 can thwart attack scenarios which may not be reliably detected by the high/low VMs (e.g. by the LVDs).

In an SoC, such as SoC 400, an attacker can attempt to manipulate supply voltages independently. For example, the attacker may attempt an attack by keeping core logic 408 operational while lowering Vnvm such that NVM 406 appears empty to core logic 408 because every output of NVM 406 appears to be a logic zero. In this situation, depending on how low the Vnvm is lowered, LVD 404 may or may not detect a problem with Vnvm, and LVD 402 would not detect any issues with Vcore. However, since supply proportion checker 410 ensures that the proportionality between the supplies is maintained (i.e. ensures the supplies are properly aligned to each other) by forcing a reset of SoC 400 if the proper proportionality is not maintained, the attacker would be required to lower Vcore if lowering Vnvm. In this manner, supply proportion checker 410 prevents an attacker from being able to lower one supply voltage in one category or supply path while not sufficiently lowering another supply voltage in a different category or supply path to maintain the required conditions. This limits the different combinations an attacker can attempt. If the attackers is lowering Vnvm so much that it appears the NVM is empty, in also lowering Vcore, the attacker could actually cause the core logic to fail as well, thus rendering the attack infeasible. In this manner, the supply proportion checkers described herein can prevent attack scenarios which cannot be detected with just the use of high/low VMs (such as LVDs).

Therefore, by now it can be understood how a supply proportion checker is used to check that the various supply rails within an SoC are operating within legitimate proportions to other supply rails, in accordance to various different rule types, and cause a reset otherwise. In one embodiment, each supply rail, including those at the pins of the SoC and those internal to the SoC, is routed to the supply proportion checker. In addition, the control settings for the internal voltage supply switches between supply rails are also routed to the supply proportion checker. The supply proportion checker uses the received information to check proportionality of voltage rails with respect to each other (either along a same voltage path, or across voltage paths or domains). Furthermore, the checks can be performed with passive elements which do not require the application of trim values, which may allow the supply proportion checker to be activated at power-up to provide early protection, prior to completion of a reset sequence.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or a "b" following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIGS. 1, 2, and 4 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of SoC 100 are circuitry located on a single integrated circuit or within a same device. Alternatively, the supply proportion checker may be used in a system which includes any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, more or fewer rule types may be checked in order to ensure proper proportionality between supply voltages or voltage domains. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a System-on-Chip (SoC) includes a first voltage supply pin configured to receive a first supply voltage; a second voltage supply pin configured to receive a second supply voltage; a first supply path beginning at the first supply pin and including a first plurality of voltage supply nodes and a supply switch coupled between adjacent voltage supply nodes of the first plurality of supply nodes, wherein each voltage supply node of the first plurality of voltage supply nodes is configured to provide a corresponding internal voltage supply to a corresponding portion of the SoC; and a supply proportion checker coupled to receive the corresponding internal voltage supply from each voltage supply node of the first plurality of voltage supply nodes, and configured to determine whether a first internal voltage supply supplied by a first supply node of the first plurality of voltage supply nodes has a legitimate proportion to a second internal voltage supply supplied by a second supply node of the first plurality of voltage supply nodes, different from the first voltage supply node, wherein the supply proportion checker is configured to check legitimacy of the proportion between the first and second internal voltage supplies using only resistors which do not require trimming. In one aspect, the SoC further includes a second supply path beginning at the second supply pin and including a second plurality of voltage supply nodes and a supply switch coupled between adjacent voltage supply nodes of the second plurality of supply nodes, wherein each voltage supply node of the second plurality of voltage supply nodes is configured to provide a corresponding internal voltage supply to a corresponding portion of the SoC; wherein the supply proportion checker is configured to determine whether the first internal voltage supply has a legitimate proportion to a third internal voltage supply supplied by a first supply node of the second plurality of supply nodes, wherein the supply proportion checker is configured to check legitimacy of the proportion between the first and third internal voltage supplies using only resistors which do not require trimming. In another aspect, the supply proportion checker is configured to check the legitimacy of the proportions upon power-up, prior to completing a reset sequence. In another aspect, the SoC further includes a voltage monitor configured to monitor that the first voltage supply is within an allowable voltage range, wherein the voltage monitor requires application of at least one trim value to perform the monitoring. In a further aspect, the supply proportion checker is configured to check the legitimacy of the proportions at a first time after powering up; and the voltage monitor is activated, at a second time, to perform the monitoring after application of the at least one trim value, wherein the second time occurs later in time with respect to powering up than the first time. In yet another aspect of the above embodiment, the supply proportion checker is configured to request a reset of the SoC in response to determining that the proportion between the first and second internal voltage supplies is not legitimate. In another aspect, each internal voltage supply of the SoC is categorized into one voltage supply category of a predetermined set of voltage supply categories, each category corresponding to a particular voltage value intended to be supplied by each internal voltage supply of the category, wherein the supply proportion checker is configured to check legitimacy of internal voltage supplies in one category with respect to internal voltage supplies in another category.

In another aspect, the supply proportion checker is configured to check the legitimacy of the proportion between the first and second internal voltage supplies using a combination of resistors which do not require trimming and diodes which do not require trimming.

In another embodiment, a System-on-Chip (SoC) includes a first voltage supply pin configured to receive a first supply voltage; a second voltage supply pin configured to receive a second supply voltage; a first supply path beginning at the first supply pin and including a first plurality of voltage supply nodes and a supply switch coupled between adjacent voltage supply nodes of the first plurality of supply nodes, wherein each voltage supply node of the first plurality of voltage supply nodes is configured to provide a corresponding internal voltage supply to a corresponding portion of the SoC; a second supply path beginning at the second supply pin and including a second plurality of voltage supply nodes and a supply switch coupled between adjacent voltage supply nodes of the second plurality of supply nodes, wherein each voltage supply node of the second plurality of voltage supply nodes is configured to provide a corresponding internal voltage supply to a corresponding portion of the SoC; and a supply proportion checker coupled to receive the corresponding internal voltage supply from each voltage supply node of the first plurality of voltage supply nodes. The supply proportion checker is configured to check legitimacy of a proportion between a first internal voltage supply supplied by a first supply node of the first plurality of voltage supply nodes and a second internal voltage supply supplied by a first supply node of the second plurality of voltage supply nodes, and configured to request a reset of the SoC if the proportion is not legitimate. In one aspect, the first voltage supply node corresponds to an internal voltage supply rail for a core, and the second voltage supply node corresponds to an internal voltage supply rail for a non-volatile memory (NVM). In a further aspect, the supply proportion checker comprises a resistor ladder for use in checking the legitimacy of the proportion between the first and second internal voltage supplies, wherein none of the resistors of the resistor ladder require trimming. In another further aspect, the SoC further includes a first voltage monitor configured to check that the internal voltage supply rail for the core is within an acceptable voltage range for the core, and configured to request a reset of the SoC if the internal voltage supply rail is not within the acceptable voltage range for the core; and a second voltage monitor configured to check that the internal voltage supply rail for the NVM is within an acceptable voltage range for the NVM, and configured to request a reset of the SoC if the internal voltage supply rail is not within the acceptable voltage range for the NVM. In yet a further aspect, when the first internal voltage supply is lowered by a first amount and the second internal voltage supply is lowered by a second amount, the first voltage monitor is configured to indicate that the lowered internal voltage supply rail for the core remains in the acceptable voltage range for the core, the second voltage monitor is configured to indicate that the lowered internal voltage supply rail for the NVM remains in the acceptable voltage range for the NVM, and the supply proportion checker is configured to indicate that the proportion between the lowered internal voltage supply rail for the core and the lowered internal supply rail for the NVM is no longer legitimate and requests reset of the SoC. In another aspect of the another embodiment, the first voltage supply node corresponds to an internal voltage supply rail for a processor, and the second voltage supply node corresponds to an internal voltage supply rail for a memory. In yet another aspect, the supply proportion checker is configured to check the legitimacy of the proportion upon power-up, prior to completing a reset sequence.

In yet another embodiment, a System-on-Chip (SoC) includes a first voltage supply pin configured to receive a first supply voltage; a first supply path beginning at the first supply pin and including a first plurality of voltage supply nodes and a supply switch coupled between adjacent voltage supply nodes of the first plurality of supply nodes, wherein each voltage supply node of the first plurality of voltage supply nodes is configured to provide a corresponding internal voltage supply to a corresponding portion of the SoC; a second supply path beginning at a branching node of the first plurality of voltage supply nodes of the first supply path and including a second plurality of voltage supply nodes and a supply switch coupled between adjacent voltage supply nodes of the second plurality of supply nodes, wherein each voltage supply node of the second plurality of voltage supply nodes is configured to provide a corresponding internal voltage supply to a corresponding portion of the SoC; and a supply proportion checker coupled to receive the corresponding internal voltage supply from each voltage supply node of the first plurality of voltage supply nodes, configured to check if a first internal voltage supply supplied by a first supply node of the first plurality of voltage supply nodes agrees with states of one or more supply switches of the first supply path located between the first supply node and the first supply pin, and configured to request reset of the SoC if there is not agreement. In one aspect of the yet another embodiment, the supply proportion checker is further configured to check if a second internal voltage supply supplied by a first supply node of the second plurality of voltage supply nodes agrees with the states of one or more supply switches of the second supply path located between the second supply node of the second plurality of voltage supply nodes and the branching node, and configured to request reset of the SoC if there is not agreement. In yet another further aspect, the supply proportion checker is further configured to check if the second internal voltage supply supplied by a first supply node of the second plurality of voltage supply nodes agrees with the states of one or more supply switches of the first supply path located between the branching node and the first supply pin, and configured to request reset of the SoC if there is not agreement. In yet another further aspect, the supply proportion checker is configured to check if the first internal voltage supply agrees with the states of the one or more supply switches, prior to completing a reset sequence.

What is claimed is:

1. A System-on-Chip (SoC) comprising:
   a first voltage supply pin configured to receive a first supply voltage;
   a second voltage supply pin configured to receive a second supply voltage;
   a first supply path beginning at the first supply pin, the first supply path comprising a first plurality of voltage supply nodes and a supply switch coupled between adjacent voltage supply nodes of the first plurality of supply nodes, wherein each voltage supply node of the first plurality of voltage supply nodes is configured to provide a corresponding internal voltage supply to a corresponding portion of the SoC;
   a supply proportion checker coupled to receive the corresponding internal voltage supply from each voltage supply node of the first plurality of voltage supply nodes, and configured to determine whether a first internal voltage supply supplied by a first voltage supply node of the first plurality of voltage supply nodes has a legitimate proportion to a second internal voltage supply supplied by a second voltage supply node of the first plurality of voltage supply nodes, different from the first voltage supply node, wherein the supply proportion checker is configured to check legitimacy of the proportion between the first and second internal voltage supplies using only resistors which do not require trimming; and a voltage monitor configured to monitor that the first supply voltage is within an allowable voltage range, wherein the voltage monitor requires application of at least one trim value to perform the monitoring, wherein:

the supply proportion checker is configured to check the legitimacy of the proportions at a first time after powering up; and the voltage monitor is activated, at a second time, to perform the monitoring after application of the at least one trim value, wherein the second time occurs later in time with respect to powering up than the first time.

2. The SoC of claim 1, wherein the supply proportion checker is configured to check the legitimacy of the proportions upon power-up, prior to completing a reset sequence.

3. The SoC of claim 1, wherein the supply proportion checker is configured to request a reset of the SoC in response to determining that the proportion between the first and second internal voltage supplies is not legitimate.

4. The SoC of claim 1, wherein the supply proportion checker is configured to check the legitimacy of the proportion between the first and second internal voltage supplies using a combination of resistors which do not require trimming and diodes which do not require trimming.

5. The SoC of claim 1, further comprising:

a second supply path beginning at a branching node of the first plurality of voltage supply nodes of the first supply path, the second supply path comprising a second plurality of voltage supply nodes and a supply switch coupled between adjacent voltage supply nodes of the second plurality of voltage supply nodes, wherein each voltage supply node of the second plurality of voltage supply nodes is configured to provide a corresponding internal voltage supply to a corresponding portion of the SoC;

wherein the supply proportion checker is further configured to check if a third internal voltage supply supplied by a third supply node of the first plurality of voltage supply nodes agrees with states of one or more supply switches of the first supply path located between the third voltage supply node and the first supply pin, and configured to request reset of the SoC if there is not agreement.

6. The SoC of claim 5, wherein the supply proportion checker is further configured to check if a fourth internal voltage supply supplied by a first voltage supply node of the second plurality of voltage supply nodes agrees with the states of one or more supply switches of the second supply path located between the first voltage supply node of the second plurality of voltage supply nodes and the branching node, and configured to request reset of the SoC if there is not agreement.

7. The SoC of claim 6, wherein the supply proportion checker is further configured to check if the fourth internal voltage supply supplied by the first voltage supply node of the second plurality of voltage supply nodes agrees with the states of one or more supply switches of the first supply path located between the branching node and the first supply pin, and configured to request reset of the SoC if there is not agreement.

8. A System-on-Chip (SoC) comprising:

a first voltage supply pin configured to receive a first supply voltage;

a second voltage supply pin configured to receive a second supply voltage;

a first supply path beginning at the first supply pin, the first supply path comprising a first plurality of voltage supply nodes and a supply switch coupled between adjacent voltage supply nodes of the first plurality of supply nodes, wherein each voltage supply node of the first plurality of voltage supply nodes is configured to provide a corresponding internal voltage supply to a corresponding portion of the SoC;

a supply proportion checker coupled to receive the corresponding internal voltage supply from each voltage supply node of the first plurality of voltage supply nodes, and configured to determine whether a first internal voltage supply supplied by a first voltage supply node of the first plurality of voltage supply nodes has a legitimate proportion to a second internal voltage supply supplied by a second voltage supply node of the first plurality of voltage supply nodes, different from the first voltage supply node, wherein the supply proportion checker is configured to check legitimacy of the proportion between the first and second internal voltage supplies using only resistors which do not require trimming; and a second supply path beginning at the second supply pin, the second supply path comprising a second plurality of voltage supply nodes and a supply switch coupled between adjacent voltage supply nodes of the second plurality of supply nodes, wherein each voltage supply node of the second plurality of voltage supply nodes is configured to provide a corresponding internal voltage supply to a corresponding portion of the SoC;

wherein the supply proportion checker is further configured to determine whether the first internal voltage supply has a legitimate proportion to a third internal voltage supply supplied by a first voltage supply node of the second plurality of voltage supply nodes, wherein the supply proportion checker is configured to check legitimacy of the proportion between the first and third internal voltage supplies using only resistors which do not require trimming.

9. The SoC of claim 8, further comprising:

a voltage monitor configured to monitor that the first supply voltage is within an allowable voltage range, wherein the voltage monitor requires application of at least one trim value to perform the monitoring.

10. The SoC of claim 9, wherein:

the supply proportion checker is configured to check the legitimacy of the proportions at a first time after powering up; and the voltage monitor is activated, at a second time, to perform the monitoring after application of the at least one trim value, wherein the second time occurs later in time with respect to powering up than the first time.

11. The SoC of claim 8, wherein the supply proportion checker is configured to check the legitimacy of the proportions upon power-up, prior to completing a reset sequence.

12. The SoC of claim 8, wherein the supply proportion checker is configured to request a reset of the SoC in response to determining that the proportion between the first and second internal voltage supplies is not legitimate.

13. The SoC of claim 8, further comprising:
a third supply path beginning at a branching node of the first plurality of voltage supply nodes of the first supply path, the third supply path comprising a third plurality of voltage supply nodes and a supply switch coupled between adjacent voltage supply nodes of the third plurality of voltage supply nodes, wherein each voltage supply node of the third plurality of voltage supply nodes is configured to provide a corresponding internal voltage supply to a corresponding portion of the SoC;
wherein the supply proportion checker is further configured to check if a fourth internal voltage supply supplied by a third voltage supply node of the first plurality of voltage supply nodes agrees with states of one or more supply switches of the first supply path located between the third voltage supply node and the first supply pin, and configured to request reset of the SoC if there is not agreement.

14. The SoC of claim 13, wherein the supply proportion checker is further configured to check if a fifth internal voltage supply supplied by a first voltage supply node of the third plurality of voltage supply nodes agrees with the states of one or more supply switches of the third supply path located between the first voltage supply node of the third plurality of voltage supply nodes and the branching node, and configured to request reset of the SoC if there is not agreement.

15. The SoC of claim 14, wherein the supply proportion checker is further configured to check if the fifth internal voltage supply supplied by the first voltage supply node of the third plurality of voltage supply nodes agrees with the states of one or more supply switches of the first supply path located between the branching node and the first supply pin, and configured to request reset of the SoC if there is not agreement.

16. A System-on-Chip (SoC) comprising:
a first voltage supply pin configured to receive a first supply voltage;
a second voltage supply pin configured to receive a second supply voltage;
a first supply path beginning at the first supply pin, the first supply path comprising a first plurality of voltage supply nodes and a supply switch coupled between adjacent voltage supply nodes of the first plurality of supply nodes, wherein each voltage supply node of the first plurality of voltage supply nodes is configured to provide a corresponding internal voltage supply to a corresponding portion of the SoC; and
a supply proportion checker coupled to receive the corresponding internal voltage supply from each voltage supply node of the first plurality of voltage supply nodes, and configured to determine whether a first internal voltage supply supplied by a first voltage supply node of the first plurality of voltage supply nodes has a legitimate proportion to a second internal voltage supply supplied by a second voltage supply node of the first plurality of voltage supply nodes, different from the first voltage supply node, wherein the supply proportion checker is configured to check legitimacy of the proportion between the first and second internal voltage supplies using only resistors which do not require trimming;
wherein each internal voltage supply of the SoC is categorized into one voltage supply category of a predetermined set of voltage supply categories, each category corresponding to a particular voltage value intended to be supplied by each internal voltage supply of the category, wherein the supply proportion checker is configured to check legitimacy of internal voltage supplies in one category with respect to internal voltage supplies in another category.

17. The SoC of claim 16, further comprising:
a voltage monitor configured to monitor that the first supply voltage is within an allowable voltage range, wherein the voltage monitor requires application of at least one trim value to perform the monitoring, wherein:
the supply proportion checker is configured to check the legitimacy of the proportions at a first time after powering up; and
the voltage monitor is activated, at a second time, to perform the monitoring after application of the at least one trim value, wherein the second time occurs later in time with respect to powering up than the first time.

18. The SoC of claim 16, wherein the supply proportion checker is configured to check the legitimacy of the proportions upon power-up, prior to completing a reset sequence.

19. The SoC of claim 16, wherein the supply proportion checker is configured to request a reset of the SoC in response to determining that the proportion between the first and second internal voltage supplies is not legitimate.

20. A System-on-Chip (SoC) comprising:
a first voltage supply pin configured to receive a first supply voltage;
a second voltage supply pin configured to receive a second supply voltage;
a first supply path beginning at the first supply pin, the first supply path comprising a first plurality of voltage supply nodes and a supply switch coupled between adjacent voltage supply nodes of the first plurality of supply nodes, wherein each voltage supply node of the first plurality of voltage supply nodes is configured to provide a corresponding internal voltage supply to a corresponding portion of the SoC;
a second supply path beginning at the second supply pin, the second supply path comprising a second plurality of voltage supply nodes and a supply switch coupled between adjacent voltage supply nodes of the second plurality of voltage supply nodes, wherein each voltage supply node of the second plurality of voltage supply nodes is configured to provide a corresponding internal voltage supply to a corresponding portion of the SoC; and
a supply proportion checker coupled to receive the corresponding internal voltage supply from each voltage supply node of the first plurality of voltage supply nodes, and configured to check legitimacy of a proportion between a first internal voltage supply supplied by a first voltage supply node of the first plurality of voltage supply nodes and a second internal voltage supply supplied by a first voltage supply node of the second plurality of voltage supply nodes, and configured to request a reset of the SoC if the proportion is not legitimate, wherein the supply proportion checker is configured to check the legitimacy of the proportion upon power-up, prior to completing a reset sequence.

21. The SoC of claim 20, wherein the first voltage supply node corresponds to an internal voltage supply rail for a processor, and the second voltage supply node corresponds to an internal voltage supply rail for a memory.

22. The SoC of claim 20, wherein the supply proportion checker is configured to check legitimacy of the proportion between the first and second internal voltage supplies using only resistors which do not require trimming.

23. A System-on-Chip (SoC) comprising:
- a first voltage supply pin configured to receive a first supply voltage;
- a second voltage supply pin configured to receive a second supply voltage;
- a first supply path beginning at the first supply pin, the first supply path comprising a first plurality of voltage supply nodes and a supply switch coupled between adjacent voltage supply nodes of the first plurality of supply nodes, wherein each voltage supply node of the first plurality of voltage supply nodes is configured to provide a corresponding internal voltage supply to a corresponding portion of the SoC;
- a second supply path beginning at the second supply pin, the second supply path comprising a second plurality of voltage supply nodes and a supply switch coupled between adjacent voltage supply nodes of the second plurality of voltage supply nodes, wherein each voltage supply node of the second plurality of voltage supply nodes is configured to provide a corresponding internal voltage supply to a corresponding portion of the SoC; and
- a supply proportion checker coupled to receive the corresponding internal voltage supply from each voltage supply node of the first plurality of voltage supply nodes, and configured to check legitimacy of a proportion between a first internal voltage supply supplied by a first voltage supply node of the first plurality of voltage supply nodes and a second internal voltage supply supplied by a first voltage supply node of the second plurality of voltage supply nodes, and configured to request a reset of the SoC if the proportion is not legitimate, wherein the first voltage supply node corresponds to an internal voltage supply rail for a core, and the second voltage supply node corresponds to an internal voltage supply rail for a non-volatile memory (NVM);
- a first voltage monitor configured to check that the internal voltage supply rail for the core is within an acceptable voltage range for the core, and configured to request a reset of the SoC if the internal voltage supply rail is not within the acceptable voltage range for the core; and
- a second voltage monitor configured to check that the internal voltage supply rail for the NVM is within an acceptable voltage range for the NVM, and configured to request a reset of the SoC if the internal voltage supply rail is not within the acceptable voltage range for the NVM, wherein when the first internal voltage supply rail is lowered by a first amount and the second internal voltage supply rail is lowered by a second amount:
  - the first voltage monitor is configured to indicate that the lowered internal voltage supply rail for the core remains in the acceptable voltage range for the core,
  - the second voltage monitor is configured to indicate that the lowered internal voltage supply rail for the NVM remains in the acceptable voltage range for the NVM, and
  - the supply proportion checker is configured to indicate that the proportion between the lowered internal voltage supply rail for the core and the lowered internal supply rail for the NVM is no longer legitimate and requests reset of the SoC.

24. The SoC of claim 23, wherein the supply proportion checker comprises a resistor ladder for use in checking the legitimacy of the proportion between the first and second internal voltage supplies, wherein none of the resistors of the resistor ladder require trimming.

* * * * *